Figure 1:
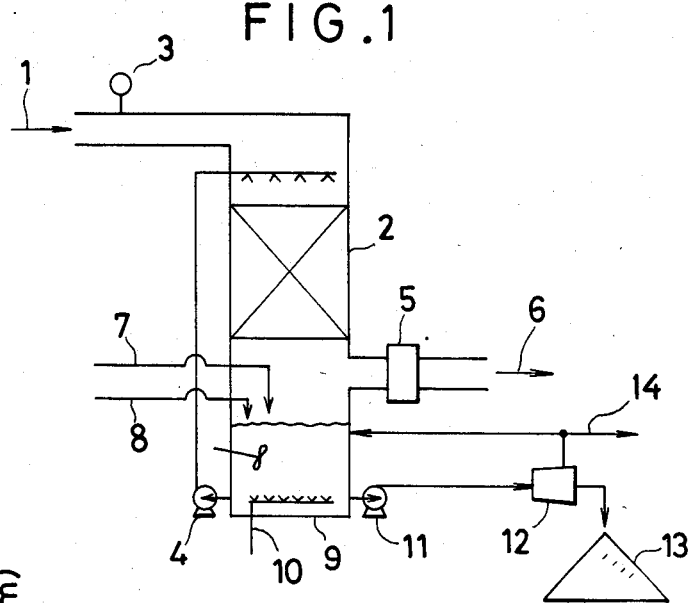

United States Patent [19]

Shinoda et al.

[11] Patent Number: 4,675,167

[45] Date of Patent: Jun. 23, 1987

[54] METHOD OF TREATING EXHAUST GASES

[75] Inventors: Naoharu Shinoda; Atsushi Tatani; Masakazu Onizuka; Setsuo Omoto; Susumu Okino, all of Hiroshima, Japan

[73] Assignee: Mitsubishi Jukogyo Kabushiki Kaisha, Tokyo, Japan

[21] Appl. No.: 587,188

[22] Filed: Mar. 7, 1984

[30] Foreign Application Priority Data

Mar. 7, 1983 [JP] Japan .................................. 58-35861
Jan. 25, 1984 [JP] Japan .................................. 59-10219

[51] Int. Cl.$^4$ ............................................. C01B 17/00
[52] U.S. Cl. ..................................... 423/242; 423/240
[58] Field of Search ........... 423/242 A, 242 R, 240 R, 423/240 S

[56] References Cited

U.S. PATENT DOCUMENTS 2,813,000  11/1957  Quittenton .................... 423/240 R
3,904,742  9/1975   Akimoto ........................... 423/242
4,108,959  8/1978   Tatani et al. ...................... 423/242

Primary Examiner—Gregory A. Heller
Attorney, Agent, or Firm—Toren, McGeady & Associates

[57] ABSTRACT

In treating exhaust gases containing $SO_2$, HCl and HF, there is disclosed a method of treating such exhaust gas which comprises detecting the amounts of HCl and HF in the exhaust gas and supplying an amount of a magnesium compound commensurate with a stoichiometric amount to become at least $MgCl_2$ and $MgF_2$ in an exhaust-gas treating tower and a calcium compound as a $SO_2$ solvent into the exhaust-gas treating tower.

The aforesaid method of treating an exhaust gas comprises a method of causing Mn ion to coexist in an absorbing solution in contact with the exhaust gas.

3 Claims, 3 Drawing Figures

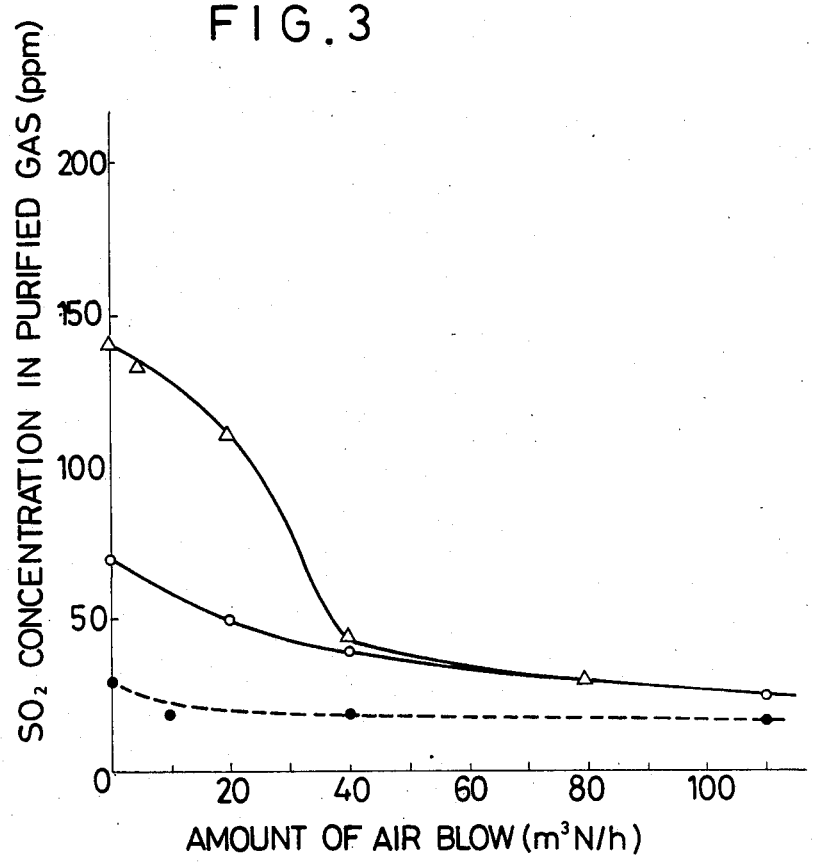

METHOD OF TREATING EXHAUST GASES

The present invention relates to a method of treating exhaust gases and more particularly, to a wet-type method of treating an exhaust gas such as coal-burnt gas containing $SO_2$, HCl and HF.

In carrying out an exhaust-smoke desulfurizing operation by the generally known wet-type lime method, there are cases where exhaust gas may contain, besides $SO_X$, HCl and HF as harmful components. An example of such components present in coal-burnt gas consists of $SO_X$, about 1,000 ppm, HCl, about 60 ppm and HF, about 40 ppm.

In the case of treating such exhaust gas with $CaCO_3$ as a $SO_2$ absorbent in an exhaust-gas treating tower of the wet type, the following reactions will take place.

$$CaCO_3 + SO_2 \rightarrow CaSO_3 + CO_2 \quad (1)$$

$$CaCO_3 + 2HCl \rightarrow CaCl_2 + CO_2 + H_2O \quad (2)$$

$$CaCO_3 + 2HF \rightarrow CaF_3 + CO_2 + H_2O \quad (3)$$

Yet, of these reactions, the reaction (2) is sure to precede so that the occurrence of $Ca^{2+}$ from CaCl in said reaction may hinder the dissolution of $CaCO_3$ and consequently, the reaction (1) is disturbed. Under these conditions, there occur the lowering of $SO_2$ absorption and the adhesion of scale of $CaSO_4.2H_2O$ to the surface of material of the apparatus because such scale is formed by desulfurizing reaction in the exhaust-gas treating tower until the running operation of the exhaust-gas treating apparatus becomes troublesome.

In order to avoid such a drawback, an amount of a magnesium salt commensurate with the amount of HCl is added for converting $CaCl_2$ to $MgCl_2$ in the undermentioned action by a method useful for the above mentioned purpose, which method is disclosed in Public Disclosure of Japanese Patent Application, SHO-53-17565.

$$CaCl_2 + MgX \rightarrow MgCl_2 + CaX \quad (4)$$

wherein X indicates anion other than Cl.

On the other hand, HF is not fixed as $CaF_2$ of low solubility in such a manner as shown in the reaction (3) but proceeds with dissolving Al component contained in dust of the exhaust gas so that the dissolution of $CaCO_3$ is hindered by mutual action of Al ion and F ion. In order to avoid such inconvenience, there is a method of adding a basic sodium salt as described in Public Disclosure of Japanese Patent Application, SHO-55-167023.

Accordingly, in treating an exhaust gas containing $SO_2$, HCl and HF, such a method proves useful without trouble originating from $CaCl_2$, Al ion and F ion by adding an amount of a magnesium salt commensurate with the amount of HCl and further by adding a basic sodium salt. Then, on halfway of confirmation of the aforesaid method, the inventors of the present invention discovered that the reactions (5) and (6) hereinafter described can proceed at a time by adding an amount of a magnesium compound commensurate with the amount of HCl and HF even without the addition of a basic sodium salt, thereby simultaneously resolving the problems of lowering of $SO_2$ absorption, adhesion of scale of $CaSO_4.2H_2O$ and disturbance of dissolution of $CaCO_3$, all in all. Thus, the first object of the present invention is to provide such a method of treating exhaust gases.

Moreover, the inventors have tried to ensure a gradual increase in Mn ion in an absorbing solution by adding $MnSO_4$ and obtained by very interesting results. Namely, it has been discovered that when the concentration of Mn ion in the absorbing solution is increased and even when the amount of a magnesium compound for addition is made less than a stoichiometric amount for those of HCl and HF, the dissolution of $CaCO_3$ cannot be recognized and desulfurizing function can be enhanced. The second object of the present invention is to provide the aforesaid method of treating exhaust gases.

Namely, in treating an exhaust gas containing $SO_2$, HCl and HF, the first invention relates to a method of treating an exhaust gas containing $SO_2$, HCl and HF which comprises detecting the amounts of HCl and HF in the exhaust gas and supplying an amount of a magnesium compound commensurate with a stoichiometric amount to become at least $MgCl_2$ and $MgF_2$ in an exhaust-gas treating tower and a calcium compound as a $SO_2$ absorbent into the exhaust-gas treating tower.

Likewise, in treating an exhaust gas containing $SO_2$, HCl and HF, the second invention relates to a method of treating an exhaust gas containing $SO_2$, HCl and HF which comprises detecting the amount of HCl in the exhaust gas, supplying an amount of a magnesium compound commensurate with a stoichiometric amount to become at least $MgCl_2$ in an exhaust-gas treating tower and a calcium compound as a $SO_2$ absorbent into the exhaust-gas treating tower and causing Mn ion to coexist in the absorbing solution in contact with said exhaust gas.

Figure 2:
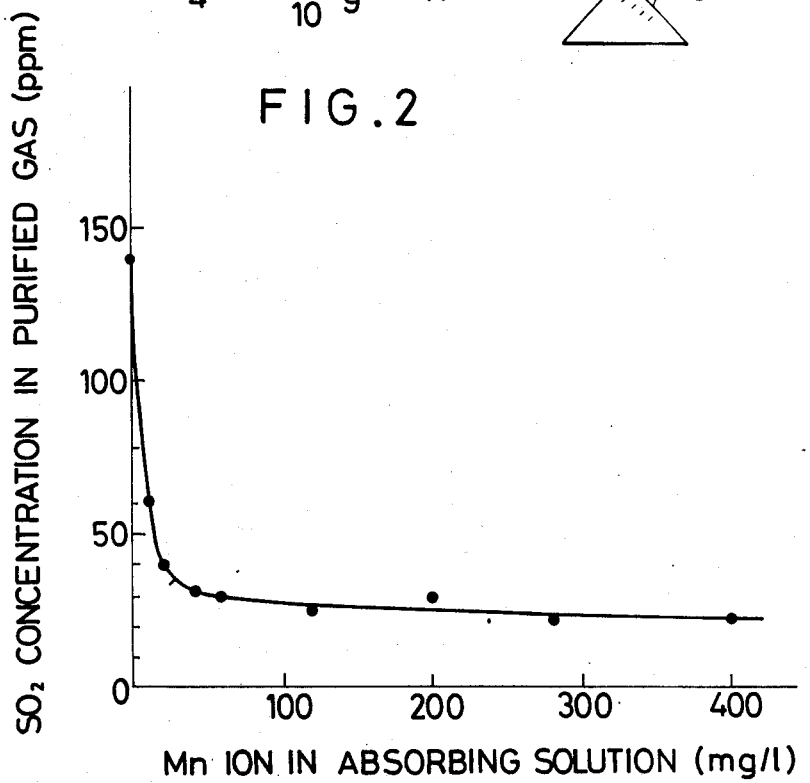

These and other objects, characteristics and advantages of the present invention will be more apparent from the following detailed description when considered in conjunction with the accompanying drawings wherein:

FIG. 1 is a flow sheet showing a preferred embodiment of the present invention;

FIG. 2 is a diagram of experimental data obtained in the preferred embodiment of the present invention, showing the concentration of $SO_2$ contained in purified gas 6 by adding $Mg(OH)_2$ in a stoichiometric amount for the amount of HCl until the concentration of Mn ion in the absorbing solution reaches 400 mg/l; and FIG. 3 is a diagram of experimental data obtained in the preferred embodiment of the present invention wherein there is shown the relationship between changes in amount of air blow till its supply is stopped in the absorbing solution and the concentration of $SO_2$ contained in purified gas 6.

The method of the present invention will be explained in detailed hereinafter.

Firstly, an example of reaction in the case of using $Mg(OH)_2$ will be shown but there is no large difference in effect provided that magnesium compounds are used such as burnt dolomite, MgO and $MgSO_4$ which are capable of forming $MgF_2$ and $MgCl_2$ as follows.

$$Mg(OH)_2 + 2HF \rightarrow MgF_2 + 2H_2O \quad (5)$$

$$Mg(OH)_2 + 2HCl \rightarrow MgCl_2 + 2H_2O \quad (6)$$

$MgCl_2$ thus formed by the reaction (6) is of such a high solubility and the concentration of Mg ion is so large that $MgF_2$ of low solubility formed by the reaction (5)

tends to be separated until the dissolution of $CaCO_3$ can return to normal.

The fixation of F ion due to said separation of $MgF_2$ can be further promoted as the amount of a magnesium compound commensurate with the amount of HCl is increased and the concentration of $MgCl_2$ in the absorbing solution becomes all the more high. Namely, when Mg ion as common ion is increased from the formula of multiplication of solubilities of Mg ion and F ion $[Mg^{2+}][F^-]^2=K$, F ion will naturally become less.

In the case of no addition of a magnesium compound, it is only natural that $CaCl_2$ of high solubility will occur until $CaF_2$ of low solubility is separated as crystal along with he increase in Ca ion but, as already aforesaid, such drawbacks cannot be avoided as the lowering of $SO_2$ absorption in the presence of $CaCl_2$ and enormous adhesion of scale of $CaSO_4.2H_2O$.

On the other hand, in the case of adding a basic sodium salt only, F ion will be neutralized to NaF but the solubility of NaF remains large and the concentration of F ion is not lowered. Accordingly, in order to decrease F ion, it becomes necessary to utilize the precipitation of $CaF_2$ by the reaction of the absorbent $CaCO_3$ and F ion but since NaF is soluble by nature, the lowering of F ion concentration is slight, as compared with the case of separated fixation of $MgF_2$ by the addition of $Mg(OH)_2$.

Also in the case of removing part of the absorbing solution, it becomes necessary to provide discharge means with measures against F in particular, so as to ensure a severe control of F discharge but there is such a drawback as the complication of equipment for decreasing F ion in the discharged solution.

By contrast, according to the method of the present invenion, upon the addition of a magnesium compound in an amount commensurate with the amount of HCl, it is dissolved and accumulated as $MgCl_2$ and therefore, a liquid obtained by separating a by-product, gypsum and crystal of calcium sulfite obtained by desulfurizing may be used by circulation to reduce the amount of discharged solution and then, the concentration of Mg ion is increased by so much until F ion becomes readily solidifiable as $MgF_2$ thus enabling the concentration of F ion in the absorbing solution to be lowered.

In the case of no addition of a magnesium compound in an amount corresponding to those of HCl and HF, $CaCl_2$, Al ion and F ion are present as dissolved in the absorbing solution, as already aforesaid, so that the function of $SO_2$ absorption with the use of $CaCO_3$ as an absorbent will become worsened. Namely, the formation of $CaCl_2$ is accompanied by the increase in Ca ion present as dissolved in the absorbing solution and there occurs the lowering of solubility of $CaSO_4.2H_2O$ (gypsum) formed along with desulfurizing and oxidation until the growth of scale of gypsum is aggravated on the one hand, and on the other hand, partial pressure of $SO_2$ becomes large in the absorbing solution containing $CaCl_2$ and the function of $SO_2$ absorption is lowered. (viz. in the absorbing solution containing $CaCl_2$, the concentration of $Ca^{2+}$ is increased, and as is clear from the formula of equilibrium of dissolution $[Ca^{2+}][S_2O_3^{2-}]=KsP$, the solubility of $SO_3^{2-}$ is lowered. The lowering of $SO_3$ as a component for dissolving $SO_2$ gas means the lowering of solubility of $SO_2$ gas. In other words, since $SO_3^{2-}$ formed upon absorption of $SO_2$ gas reaches a saturated concentration in an instant, the absorbing solution turns out to be one wherein partial pressure of $SO_2$ becomes easily high. Reversely, if $MgCl_2$ is present as dissolved in the absorbing solution, the saturated concentration of $SO_3^{2-}$ becomes high, in other words, the absorbing solution becomes highly soluble so that it can be maintained as one of low partial pressure of $SO_2$.) Furthermore, when the dissolved amounts of Al ion and F ion are increased, the solubility of $CaCO_3$ is disturbed until normal use of the desulfurizing apparatus is also hindered and the concentration of F ion in the discharge solution from the desulfurizing apparatus becomes so high that it becomes necessary to provide measures for removing F ion to prevent a secondary pollution due to the discharge of the solution.

As is clear from the aforesaid explanation, according to the method of the present invention which comprises detecting the amounts of HCl and HF in exhaust gas and supplying an amount of a magnesium compound commensurated with a stoichiometric amount to become at least $MgCl_2$ and $MgF_2$ in an exhaust-gas treating tower and a calcium compound as a $SO_2$ absorbent into the exhaust-gas treating tower, it is possible to obtain an excellent effect capable of eliminating such drawbacks as the lowering of $SO_2$ absorption due to HCl and HF, trouble due to the separation of $CaSO_4.2H_2O$ and distrubance of dissolution of a $SO_2$ absorbent.

PREFERRED EMBODIMENT

The method of the present invention was carried out by the apparatus shown in FIG. 1. In the drawing, after exhaust gas from a coal-burning boiler passed through denitrating apparatus, an electric dust collector and a heat exchanger (all are not shown in the drawing), it was conducted into an exhaust-gas treating tower 2. At the inlet of the exhaust-gas treating tower 2 was provided a detector 3 for confirming the conduction of exhaust gas, about 4,000 $Nm^3/h$ containing $SO_2$, about 1,000 ppm. HCl, about 60 ppm and HF, about 40 ppm. Grids were filled in the exhaust-gas treating tower 2 and an absorbing solution was dispersed from the top of the tower through a circulation pump 4 at the rate of 60 $m^3/h$ but $SO_2$, HCl and HF in the exhaust gas were absorbed by the absorbing solution and the gas thus treated was discharged as purified gas through a mist eliminator 5.

While $SO_2$, about 50 ppm was detected in purified gas 6, HCl and HF altogether were less than 1 ppm as the lower limit of detection. In a manner commensurate with the amount of absorption of $SO_2$, $CaCO_3$, about 17 Kg/h was supplied from a line 7 and simultaneously, $Mg(OH)_2$, no less than a stoichiometric amount (0.48 Kg/h) for the absorbed amounts of HCl and HF was supplied from a line 8. Into a tank 9 beneath the exhaust-gas treating tower 2 was supplied air blow, about 20 $Nm^3/h$ from an air nozzle 10 for oxidizing the sulfite salt formed by $SO_2$ absorption to a sulfate. The absorbing solution in the tank turned out to be a suspension containing crystal of $CaSO_4.2H_2O$ and some amount of powder of $CaCO_3$ and water was added to the suspension to make a concentration of slurry, about 18% by weight so as to adjust the balance of water.

In order to withdraw crystal of $CaSO_4.2H_2O$ (gypsum) outwardly of the system of reaction in a manner to balance $SO_2$ absorption, part of the absorbing solution was conducted to a separator 12 through a pump 11 and gypsum 13 was removed as a by-product, part of the filtrate was discharged from a line 14 and the remainder was returned to the exhaust-gas treating tower.

Cl ion, about 280 m mol/l was present as dissolved in the absorbing solution at the instant of continuous operation under ordinary conditions, while Mg ion, less than 140 m mol/l equivalent to Cl ion could never be detected. F ion present as dissolved in the absorbing solution was not detected in excess of 2 m mol/l but it had been discharged as $MgF_2$ solid outwardly of the system of reaction.

When supplying $Mg(OH)_2$ in an amount short of the amounts of absorbed HCl and HF, the lowering of desulfurizing function and the lowering of pH of the absorbing solution could be perceived and such tendency did not return to normal even by increasing the amount of supply of $CaCO_3$ as a $SO_2$ absorbent. Further, upon stopping the suppoly of $Mg(OH)_2$, there occurred an enormous lowering of desulfurizing function as well as the distrubance of dissolution of $CaCO_3$ until gypsum scaling became outstanding.

Meanwhile, in the method of the present invention, magnesium compounds for use are not limited to $Mg(OH)_2$ but any chemicals available at hand may be used provided that they are capable of producing $MgCl_2$ and $MgF_2$ by reaction with HCl and HF. Also in the case of using $Mg(OH)_2$, burnt dolomite or MgO, they were so rapidly reacted with halogen that the adjustment of addition could be easily effected while detecting pH of the absorbing solution.

Next, the second invention will be explained in detail.

In carrying out the aforesaid 1st invention, the inventors tried to make experiments of increasing Mn ion gradually in the absorbing solution to obtain very interesting results. Namely, when Mn ion was on the increase, the distrubance of dissolution of $CaCO_3$ could not be found even by decreasing the amount of supply of a magnesium compound to less than a stoichiometric amount for HCl and HF and desulfurizing function was enhanced.

In the flow sheet of FIG. 1, $MnSO_4$ was added by stepwise increasing adjustment until the concentration of Mn in the absorbing solution was increased from 0 to 400 mg/l and then there occurred variations in $SO_2$ concentration contained in purified gas 6, such variations being made clear in FIG. 2. The results of FIG. 2 show cases of data where the supply of a magnesium compound was decreased, i.e. only a stoichiometric amount of HCl was supplied and F ion, around 200 mg/l was found present as dissolved in the absorbing solution. Thus, it is apparent that even if F ion was present as dissolved in the absorbing solution, no disturbance of dissolution of $CaCO_3$ could be noted as the concentration of Mn was on the increase and desulfurizing function was improved.

By the way, the experiments of FIG. 2 were carried out without the supply of air blow from the nozzle 10 shown in the flow sheet of FIG. 1.

As is clear from FIG. 2, it is also apparent that the concentration of Mn ion developed an effect starting with a small amount (about 10 mg/l) and the effect was saturated with 400 mg/l. Subsequently, with air blow means, experimental data were obtained by decreasing the amount of air blow by degrees. Such data are shown in FIG. 3.

In FIG. 3, there are shown differentiations with respect to the presence and absence of Mn ion and the amount of addition of $Mg(OH)_2$ as parameters. Namely, in the drawing, mark indicates cases where Mn ion, 60 mg/l and an amount of $Mg(OH)_2$ corresponding to a stoichiometric amount for HCl were added (viz. the second invention), O mark indicates cases where Mn ion was not added but an amount of $Mg(OH)_2$ corresponding to a stoichiometric amount for HCl and HF was added (the first invention) and Δ mark indicates cases where Mn ion was not added but only an amount of $Mg(OH)_2$ corresponding to a stoichiometric amount for HCl was added.

When reducing the amount of air blow (it saves power required by blower), through the concentration of $SO_2$ in purified gas tended to become high in all cases, yet, in the present invention, Mn ion was caused to coexit, even while stopping the supply of air blow and only with the addition of an amount of $Mg(OH)_2$ corresponding to a stoichiometric amount for HCl, it is well understood that the tendency of increase in $SO_2$ concentration could be almost disregarded, no disturbance of dissolution of $CaCO_3$ was recognized and high desulfurizing function could be maintained.

In this manner, by supplying a magnesium compound in an amount commensurate with the amount of HCl and causing Cl ion as $MgCl_2$ to be present as dissolved and either by adding Mn ion or at the same time, by blowing air, it could be confirmed that even if F ion was present as dissolved, in other words, if it was not separated and fixed as $MgF_2$, desulfurizing function could not be lowered. It is considered ascribable to the fact that absorbed $SO_2$ is oxidized immediately with Mn ion and air blow until it becomes sulfuric acid so that sulfuric acid of strong acidity and $CaCO_3$ as a $SO_2$ absorbent may react together. Namely, the disturbance of dissolution of $CaCO_3$ to occur by mutual action of Al ion and F ion is due to the notion that sulfurous acid is weaker than sulfuric acid, and the higher the rate of oxidation of sulfurous acid to sulfuric acid is elevated, the easier the recovery of dissolved reactivity of $CaCO_3$ becomes even in the present of F ion as dissolved.

As a consequence, desulfurizing function can be improved. Eventually, it could be confirmed that, in treating an exhaust gas containing HF, HCl and $SO_2$, an amount of a magnesium compound corresponding to the amount of HCl was supplied and an amount of calcium compound as a $SO_2$ absorbent corresponding to the amount of $SO_2$ was also added and moreover, Mn ion was caused to be present in an absorbing solution, within the range of 10–400 mg/l, as is clear from FIG. 2, and air was blown into the absorbing solution to oxidize sulfurous acid to sulfuric acid and then there occurred no lowering of desulfurizing function even in the presence of F ion as dissolved.

In experimental cases of treatment of an exhaust gas, about 4,000 $Nm^3/h$ showing $SO_2$, about 1,000 ppm at the inlet, an amount of air blow within the range of 5–110 $Nm^3/h$ i.e. about 0.125–2.75% of the amount of exhaust gas was supplied. In these cases, the higher the concentration of $SO_2$ at the inlet became, the more was the amount of sulfurous acid increased so that the amount of air blow had only to be adjusted in a manner commensurate with the amount of sulfurous acid. The most favorable amount of air blow for use in the present invention can be obtained by continuously measuring the concentration of sulfite in an absorbing solution and oxidizing the sulfite until its concentration can be maintained at less than 10 m mol/l. By this means, it was confirmed that the dissolved properties of $CaCO_3$ returned to normal. Namely, FIGS. 2 and 3 show experimental cases where $SO_2$ concentration in purified gas remained within the range of less than 50 ppm and the concentration of sulfite in the absorbing solution could be found less than 10 m mol/l.

Accordingly, by detecting the concentration of sulfite, the amount of air blow was to be increased until said concentration was reduced to less than preferably 10 m mol/l. Needless to say, when air blow was not supplied and the concentration of sulfurous acid in the absorbing solution remained less than 10 m mol/l by the action of Mn ion, it was possible to maintain the dissolved properties of $CaCO_3$ in order even without the supply of air blow, as already explained hereinbefore.

The manganese compounds for addition may be $MnSO_4$, $MnOOH$, $MnO_2$ and $MnCl_2$ as sufficiently effective ones. Thus it has proved true that the effect of the present invention can be obtained with Mn present as dissolved in the absorbing solution after oxidation and reduction. Therefore, the type of anion of manganese compound may not necessarily and particularly be specified.

What is claimed is:

1. In a method for treating exhaust gases containing $SO_2$, HCl and HF, wherein the exhaust gases are passed through a treating tower containing an absorbing solution containing a calcium compound as an $SO_2$ absorbent, the improvement which comprises detecting the amounts of HCL and HF in the exhaust gas prior to its being introduced to the tower and supplying a magnesium compound to the tower in at least a stoichiometric amount to convert the HCl to $MgCl_2$ and the HF to $MgF_2$.

2. The method of claim 1 wherein air is blown into said absorbing solution.

3. The method of treating exhaust gases of claim 2 wherein the concentration of a sulfite in the absorbing solution is detected and the amount of air for supply to the absorbing solution is adjusted until said concentration of sulfite is reduced to less than 10 m mol/l.

* * * * *